March 10, 1936.                L. V. FOSTER ET AL                2,033,619
                                 SUBSTAGE LAMP
                              Filed Sept. 29, 1934

LEON V. FOSTER
HENRY F. KURTZ
INVENTORS

BY *G. H. Ellestad*
ATTORNEY

Patented Mar. 10, 1936

2,033,619

UNITED STATES PATENT OFFICE 2,033,619

SUBSTAGE LAMP

Leon V. Foster, Irondequoit, and Henry F. Kurtz, Rochester, N. Y., assignors to Bausch & Lomb Optical Company, Rochester, N. Y., a corporation of New York Application September 29, 1934, Serial No. 746,222

3 Claims. (Cl. 240—2)

This invention relates to illuminating devices and more particularly has reference to an illuminating unit which is especially adapted for illuminating an object under a microscope.

The unit is adapted to be used either directly under the stage of the conventional microscope, or close to the usual microscope mirror. Heretofore it has been the practice to construct an illuminating device for such use with a condensing reflector behind the lamp and a ground glass screen in front of the lamp. A polished convex lens between the screen and the object was optional. Such a system will produce an intense beam but the light intensity is not uniform across the beam. Even though a diffusing screen is placed between the light source and the object field the beam at the object field has relatively light and dark areas.

Microscopy demands an illumination of the greatest uniformity. At high magnifications, even the slightset irregularity of illumination of the object field destroys or greatly reduces reliability of the observations.

One of the objects of our invention is to provide an illuminating device which will give a substantially even illumination over a large field. A further object of our invention is to provide an illuminating device of simple construction which may be easily and economically produced.

These and other objects and advantages reside in certain novel features of construction, arrangement and combination of parts as will hereinafter be more fully described and pointed out in the appended claims.

Referring to the drawing.

Figure 1:
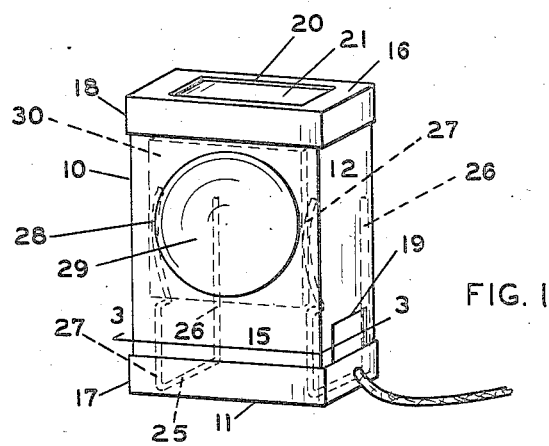
Fig. 1 is a perspective view of our improved lamp.
Figure 2:
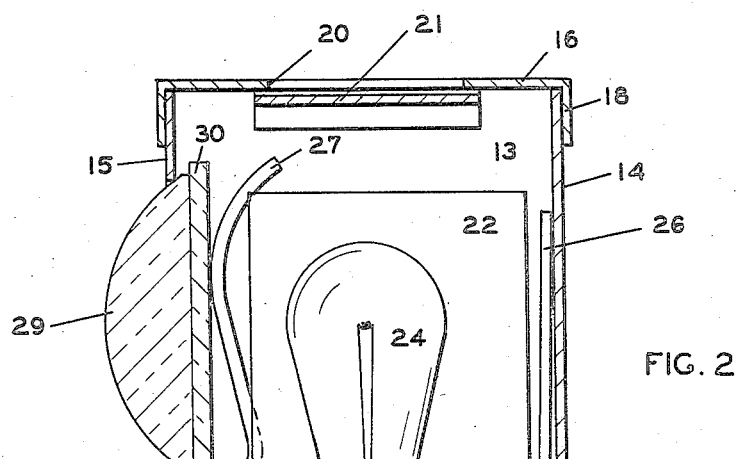
Fig. 2 is a view, partly in section, taken vertically through the device.
Figure 3:
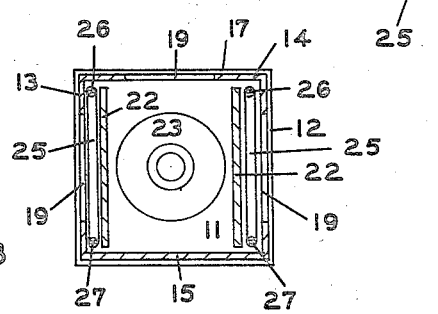
Fig. 3 is a section taken on line 3—3 of Fig. 1.

One embodiment of our invention is shown in the drawing wherein 10 indicates a lamp casing having a base 11, side walls 12 and 13, a rear wall 14, a front wall 15 and a removable top 16, each of which is made diffusely reflecting on its inner surface as by coating with aluminum paint. The base 11 and top 16 are bent at 17 and 18 respectively to engage the walls 12, 13, 14 and 15. The walls 12, 13 and 14 are each provided with a ventilating opening 19, and the top 16 is provided with a ventilating opening 20 and a baffle plate 21 which permits the escape of heat but prevents light rays from passing through the opening 20.

Mounted upon base 11 are a pair of vertical, diffusely reflecting, baffle walls 22 which extend parallel to walls 12 and 13 and are spaced therefrom so as to serve as baffles to prevent the escape of light through the side openings 19. A socket 23 carrying a lamp 24 is also mounted upon the base 11.

A pair of resilient members 25 are placed in the casing, one between wall 12 and its adjacent baffle wall 22, and the other between wall 13 and its adjacent baffle. Each of the resilient members 25 is roughly U-shaped with a straight upstanding arm 26 bearing against the rear wall 14, and a curved upstanding arm 27 tending to bear against the front wall 15.

A circular opening 28 in the front wall 14 is adapted to receive the convex surface of a plano convex lens 29 which is somewhat larger than the opening 28 and is held thereagainst by arms 27 of the resilient members 25. The lens 29 has a plane, polished surface and a convex, ground surface of revolution. Thus, as the lens has only one polished surface it is easier and cheaper to manufacture than the conventional lens having two polished surfaces.

A filter 30 may be used between the lamp 24 and the lens 29 and is held against the plano rear face of the lens 29 by means of the arms 27. The character of the filter, whether colored or uncolored, clear or diffusing, is dependent solely upon the type of work being done.

The light source 24 is located well within the focal length of the lens 29. In some instances it is placed at a distance from the lens approximately equal to one half the focal length of the lens.

From the foregoing, it will be apparent that we are able to attain the objects of our invention and provide an improved illuminating device which will give an even illumination over a large field. There is no part of the system capable of forming an image of the lamp filament which would make the beam non-uniform. The omission of the condensing reflector prevents the formation of a reflected image and the diffusing front surface of the lens, as well as the location of the light source within the focal length of the lens, prevents the formation of an image by refraction. The light beam produced by our improved lamp is of substantially uniform intensity in cross section.

Various modifications can obviously be made without departing from the spirit of our invention.

We claim:

1. A lamp of the type described comprising a casing having an opening in its front wall, a baffle plate mounted in spaced relation to each of its two side walls, a lens mounted within said opening and yieldable means positioned between each baffle plate and its adjacent side wall for holding the lens in said opening.

2. A lamp of the type described comprising a casing, the interior of which is diffusely reflecting, said casing having an opening, a light source mounted within said casing and a plano-convex lens mounted in said opening with its plano side facing said source, the outer surface of said lens being ground so as to be light diffusing.

3. A lamp of the type described comprising a casing, the interior of which is diffusely reflecting, said casing having an opening, a lens having a ground convex surface and a plane surface, said lens being positioned within said opening with its convex surface facing outwardly, and a source of light within the casing and spaced from the lens a distance less than the focal length of the lens.

LEON V. FOSTER.
HENRY F. KURTZ.